(12) United States Patent
Watson et al.

(10) Patent No.: US 7,231,738 B2
(45) Date of Patent: Jun. 19, 2007

(54) MOUSETRAP

(75) Inventors: Duncan McLeod Watson, West Ryde (AU); Brendyn Murray Rodgers, Mount Waverley (AU)

(73) Assignee: Reckitt Benckiser N.V., Hoofddorp (NL)

(*) Notice: Subject to any disclaimer, the term of this patent is extended or adjusted under 35 U.S.C. 154(b) by 0 days.

(21) Appl. No.: 11/067,157

(22) Filed: Feb. 25, 2005

(65) Prior Publication Data
US 2006/0185223 A1    Aug. 24, 2006

(30) Foreign Application Priority Data
Feb. 22, 2005   (AU)   .............................. 2005200789

(51) Int. Cl.
*A01M 23/02*   (2006.01)
(52) U.S. Cl. .............................................. 43/85; 43/67
(58) Field of Classification Search .................. 43/58, 43/60, 61, 85, 67, 65, 71, 74
See application file for complete search history.

(56) References Cited
U.S. PATENT DOCUMENTS

| | | | | |
|---|---|---|---|---|
| 1,510,346 A | * | 9/1924 | Smith | ............................ 43/74 |
| 2,454,476 A | * | 11/1948 | Price | ............................. 43/60 |
| 4,462,182 A | * | 7/1984 | French | .......................... 43/85 |
| 4,831,766 A | * | 5/1989 | Giglietti | ........................ 43/61 |
| 6,523,713 B1 | * | 2/2003 | Helms | ......................... 220/831 |

* cited by examiner

*Primary Examiner*—Kimberly S. Smith
(74) *Attorney, Agent, or Firm*—Norris McLaughlin & Marcus, PA

(57) ABSTRACT

With reference to a preferred embodiment as depicted in FIG. 4, the present invention provides a mousetrap comprising a first part (5) and a second part (10) that together define an enclosure wherein the first part (5) and the second part (10) are operably connected to a first biasing means (60). Within the enclosure is retained a lever (45) having a first end (47), a bridge (49), a pivot means (40), a releasable catch means (57) and a second biasing means (55). The second biasing means (55) biases the lever (45) into a resting position. By virtue of the second biasing means (55), the mousetrap is able to be set when held in any orientation, and is also stabilised (i.e, accidental activation of the mousetrap is avoided, or at least minimised, when the mousetrap is turned in any orientation, for example, on its side or upside down).

20 Claims, 7 Drawing Sheets

MOUSETRAP

FIELD OF THE INVENTION

The present invention relates to mousetraps for trapping and/or killing mice, in particular, domestic mice.

BACKGROUND OF THE INVENTION

Mice, although small, can still cause much damage. They destroy articles such as food, books, furniture and even appliances with their gnawing, urine and faeces. Another undesirable trait associated with mice, particularly in domestic environments, is their association with a variety of human diseases, such as for example, asthma. Mice can also spread a variety of organisms that can cause diseases of humans and pets. These include a variety of food poisoning bacteria like *Salmonella, Shigella, Escherichia coli* (*E. coli*), and others. While the risk of mouse invasion is able to be somewhat controlled or minimised by preventing food waste such as crumbs accumulating in the home, or ensuring that stored food is isolated from the external environment in, for example, sealed containers, it is not always possible to ensure that no food will be left exposed for a period of time. Also, minimising the risk of mice invasion by sealing of cracks, spaces and openings such as vents, pipes and chimney access points can be an expensive, labour intensive and time consuming exercise and is not always possible.

Traditional methods of dealing with mouse invasion in the home involves the use of poisoned baits (rodenticides) that contain anticoagulants, such as warfarin, pival and chlorophacinone. Such baits, while effective, are nevertheless toxic and are therefore undesirable for use in the home, particularly those in which children and pets reside. In addition, poisoned mice often die in inaccessible locations thereby resulting in an unpleasant odor upon death of the mouse. To circumvent these problems, mousetraps are often employed instead of poisoned baits. Traps are generally preferred as these are less hazardous to use around children and pets. Because mice are caught by the trap, there is less chance of odor from mice dying in wall voids or other inaccessible areas. Mousetraps in the form of wooden-based snap traps are common. While these traps are generally effective, they have the problem of exposing the homeowner, for example, to the highly undesirable task of disposing of the dead mouse once trapped. In addition, once trapped, the exposed dead mouse can pose health problems or cause distress to, for example, children. Furthermore, such traps are also pose a danger to children and pets who may inadvertently activate the trigger and injure themselves. Whilst mousetraps have been developed in which a trap is located within an enclosure in an attempt to isolate the trap from the outside environment and somewhat conceal the dead mouse from view, the enclosure of such mousetraps are not self-sealing after trapping and therefore the home-owner is still exposed to the dead mouse when disposing of the mouse and/or the trap.

While recognising the shortcomings of prior art mousetraps, the present inventors have sought to overcome these deficiencies with a mousetrap that substantially isolates the trap mechanism and a trapped mouse from the external environment. Such traps are desirably simple and cost effective to manufacture and are also able to efficiently trap mice. Such a mousetrap has been described in co-pending application GB 03254463 by the same applicants, the contents of which are incorporated herein in their entirety by reference. The present invention provides an alternative to the mousetrap described in GB 03254463.

SUMMARY OF THE INVENTION

The present invention provides a mousetrap comprising:
a first part and a second part together being rotatable with respect to each other and together defining an enclosure, apertures located in each of the first part and the second part, the apertures being in substantial alignment so as to define an entrance for a mouse into the mousetrap when the mousetrap is in an open position;
a first biasing means operably connected to the first part and the second part in a manner so as to bias the mousetrap towards a closed position;
means for maintaining the mousetrap in the open position comprising engagement of a lever with a stop means;
a second biasing means to bias the lever into a resting position;
the mousetrap being activated to assume the closed position by entry of the mouse whereby the mouse contacts the lever in a manner so as to cause the lever to disengage from the stop means resulting in the first part contra-rotating relative to the second part by virtue of the first biasing means thereby trapping the mouse and substantially concealing the trapped mouse within the enclosure.

In accordance with the invention, a mousetrap is provided that is self-closing following the trapping of a mouse. This self-closing feature is particularly desirable as this eliminates the exposure of a user, for example, the homeowner, to the trapped mouse or the need for the user to close the mousetrap once a mouse has been trapped.

The mousetrap in accordance with the invention is able to be set while held in any orientation and is a more stable device by virtue of the second biasing means, i.e., accidental activation of the mousetrap is minimised when, for example, a user picks up the mousetrap and turns it upside down, or its side. This is achieved through biasing of the lever against a wall of the enclosure, for example, the first part, by the use of a second biasing means. By virtue of the second biasing means, the lever is held in the resting position even when the mousetrap is held, for example, upside down, thereby allowing the mousetrap to be set from the closed position to the open position when held in any orientation. Also by virtue of the second biasing means, the lever is biased in a resting position and as such, movement of the lever, when the mousetrap is turned upside down or any orientation in which movement of the lever is subject to gravity, is minimised. In this way, accidental activation of the mousetrap is avoided or at least, minimised.

A further associated advantage with the mousetrap of the present invention is increased safety; that is, the enclosure surrounding the trap mechanism prevents, for example, a child or pet from inadvertently setting off the trap and causing possible injury. In addition, children and pets are not exposed to trapped or dead mice that can be possible sources of disease.

In a preferred embodiment of the invention, the second biasing means is located on the lever. Persons skilled in the art will appreciate, however, the that second biasing means may be located elsewhere, such as, for example, on the second part and still serve to bias the lever in a resting position. In a particularly preferred embodiment of the invention, the second biasing means is an arm extending from one end of the lever, wherein the arm is pivotally connected to the lever.

In accordance with the preferred embodiment of the invention, the lever is retained within the second part and the stop means is located on the first part. Persons skilled in the art will appreciate, however, that other configurations are possible without departing from the invention. For instance, the lever may be retained in the first part of the enclosure and the stop means located in the second part. In this configuration, the mousetrap is retained in the open position by engagement of the lever retained within the first part with the stop means located on the second part. In one example, engagement of the lever with the stop means is through a releasable catch means located on the lever that disengages the stop means upon contact and movement of the lever by the mouse.

In accordance with the preferred embodiment of the invention, the mousetrap further comprises a strike plate. The strike plate is preferably located on the first part. The strike plate may also comprise one or more projections. Such projections may be in the form of angular kinks in the strike plate profile or may be in the form of spikes so that they impale the mouse upon contact. In this way, the mouse is contacted by the strike plate and is thereby incapacitated or killed.

In accordance with the preferred embodiment of the invention, the mousetrap further comprises a catch plate. Preferably the catch plate is located on the second part. In this way, upon contra-rotation of the first part relative to the second part under the action of the first biasing means, the strike plate rotates with the first part and contacts the mouse to trap the mouse between the strike plate and the catch plate. As such, not only is the mouse struck by the strike plate upon contra-rotation of the first part relative to the second part, but it is subsequently squashed between the strike plate and the catch plate thereby increasing the effectiveness of the mousetrap to trap, incapacitate or kill the mouse. The catch plate may also comprise one or more projections. Such projections may be in the form of angular kinks in the catch plate profile or may be in the form of spikes so that they impale the mouse upon contact.

In accordance with the preferred embodiment of the invention, the lever and the second part define a gap through which a mouse is able to move through and as a result move the lever to thereby disengage the lever from the stop means.

The mousetrap in accordance with the preferred embodiment comprises at least one slot located on the first part or on the second part through which a user is able to ascertain, by visual inspection, whether the mousetrap is in the open position or the closed position. In this way, a user is able to ascertain, by visual inspection, whether the mousetrap is in the open (or "set") position or the closed (or "trapped" or "not set") position. The mousetrap according to the preferred embodiment advantageously allows the user to readily determine when the mousetrap is in the "set" position, or when a mouse has been trapped, without the need of actually observing the trapped mouse or having to pick up and shake the mousetrap. Preferably, the one or more slots are located on the first part, however, it will be appreciated that the one or more slots may be located at other positions without departing from the invention.

In accordance with the preferred embodiment of the invention, at least a section of the first part and the second part of the mousetrap is circular. Such sections thereby allow the first and second parts to rotate relative to each other. For instance, the outer surface of the first part and/or the second part may be, for example, square or hexagonal in shape, with each of the first and second parts still having a circular portion so as to be able to be interfitted in such as way as to allow the first and second parts to rotate relative to one another. In a particularly preferred embodiment of the invention however, the mousetrap outer surface and enclosure is circular in shape.

In accordance with the preferred embodiment of the invention, the first biasing means is a helical torsion spring. Alternative biasing means (for the first and/or second biasing means) include materials such as elastic materials, spring metals in leaf or flat spring form, or compression springs or any other biasing means known to persons skilled in the art.

In accordance withe the preferred embodiment, the mousetrap further comprises a bait housing which may be loaded with bait externally of the mousetrap. Preferably also, the bait housing is located substantially in the centre of the enclosure. In this way, the mouse has to enter and travel the maximum distance into the mousetrap enclosure before activating the trap. This ensures that the mouse is fully enclosed within the enclosure before trap occurs, thereby substantially concealing all parts of the trapped mouse from external view. A particularly preferred location of the bait housing is to the rear of the gap defined by the lever and the second part of the enclosure, so as to necessitate the mouse to move through the gap in order to reach any bait in the bait housing and therefore move the lever and activate the mousetrap. In addition, preferably the bait housing comprises one or more vents that allow the bait to be sensed by the mouse. The bait housing may further include one or more spikes that assist in maintaining the bait within the bait housing. Preferably also, the bait housing is able to be loaded with bait from the underside of the enclosure base. This makes the mousetrap easy and efficient to load with bait without the need for disassembly of the mousetrap. Once the bait is positioned within the bait housing, the bait may be retained in position with a seal, such as, for example, an adhesive label that is able to be peeled back to insert the bait into the bait housing and subsequently adhered to maintain the bait in position. It is also envisaged is that the mousetrap may be provided to the consumer with bait located within the bait housing. In this way, baits such as grains, nuts or seeds presented as whole or broken pieces, or as the base for a paste, gel, pellet, or extruded or moulded wax-block formulations with or without additional pheromone or animal- or plant-derived ingredients, are able to stored long-term within the mousetrap and sold as a single unit to the consumer.

In accordance with the preferred embodiment of the invention, the second part further includes a lip adapted to fit around the first part of another mousetrap thereby allowing two or more mousetraps to be stacked. This is particularly advantageous when the mousetraps are displayed for sale in multiple units per pack.

It is envisaged that the mousetrap in accordance with the present invention may be a single-use device (i.e disposable) wherein a user disposes of the mousetrap and the trapped mouse without the need to open the mousetrap and remove the mouse. The mousetrap in accordance with a preferred embodiment of the invention may, however, be reusable such that a user is able to reset the mousetrap and remove the mouse. Preferably the mouse is able to be removed through the aperture once the mousetrap has been reset. However, if necessary, the mousetrap may be disassembled so as to assist in the removal of the dead mouse. This feature also advantageously assists in the cleaning of the mousetrap after removal of a dead mouse prior to resetting the mousetrap.

The present invention will now be described in detail with reference to a number of preferred embodiments as illustrated in the accompanying figures.

DETAILED DESCRIPTION OF THE INVENTION

Figure 1:
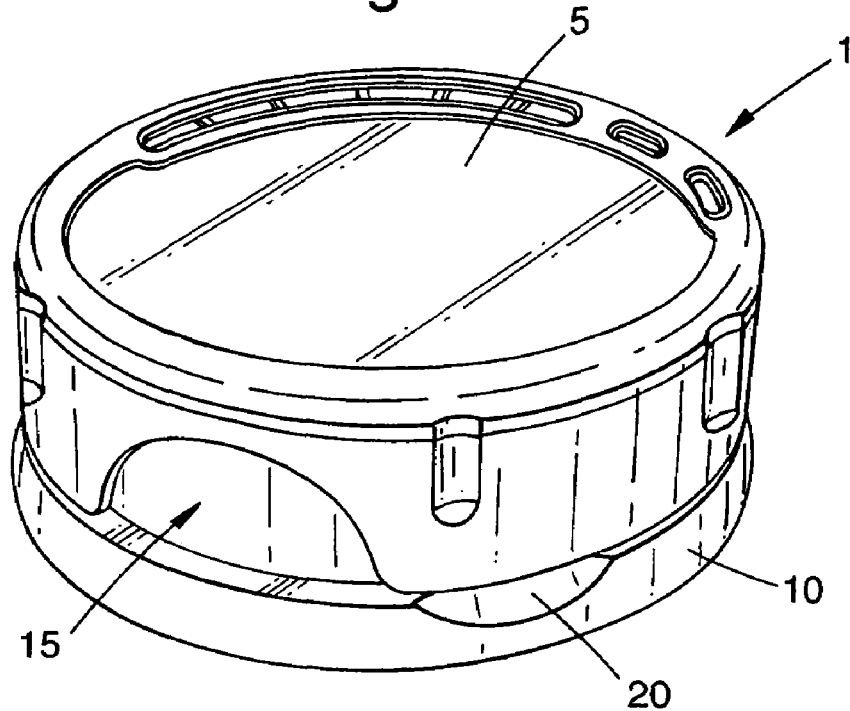
FIG. 1 depicts a perspective view the mousetrap according to a preferred embodiment of the invention wherein the mousetrap is in the closed position.
Figure 2:
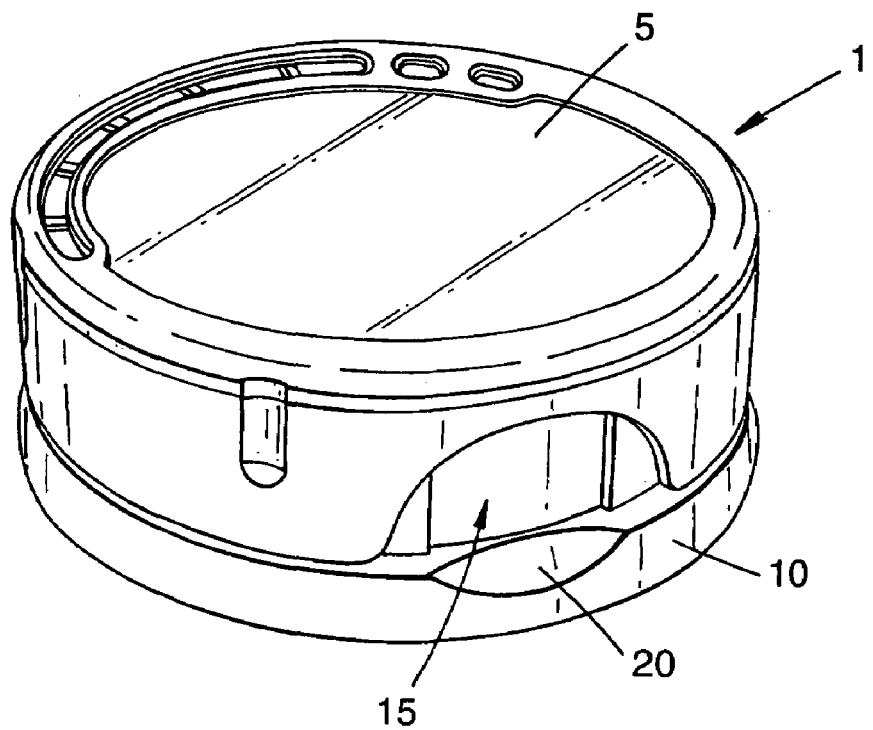
FIG. 2 depicts a perspective view of the mousetrap of FIG. 1 wherein the mousetrap is in the open position or "set" state ready for trapping a mouse.

Referring to FIGS. 1 and 2, the mousetrap 1 according to a preferred embodiment of the invention comprises a first part 5, a second part 10 which are rotatable with respect to each other and together define an enclosure. The first part 5 and the second part 10 each have an aperture 15 which, when aligned, the mousetrap 1 is in an open position so as to be able to receive a mouse. The mousetrap 1 is in the closed position as depicted in FIG. 1 and is in the open or "set position" as depicted in FIG. 2. In the open or "set" position, the apertures 15 located on the first part 5 and the second part 10 are substantially aligned with each other and also with the indentation 20 located on the second part 10.

Mice are very inquisitive animals and will thoroughly explore a new object put in their environment. In particular, mice will burrow and nest in confined spaces and they like to move with their body in contact with a wall. Generally, mice prefer small, tunnel-like or narrow-sided angular enclosures that have dark interiors. Dark interiors are generally explored before light interiors. As such, the configuration of the mousetrap 1 is particularly attractive as the first part 5 and second part 10 are prefereably fabricated from opaque materials effectively forming a tunnel-like enclosure with a dark interior. To set the mousetrap 1 from the closed position to an open position, a user, such as a homeowner, manually rotates the first part 5 relative to the second part 10 in the counter-clockwise direction until the indentation 20 is aligned with the apertures 15.

Figure 3:
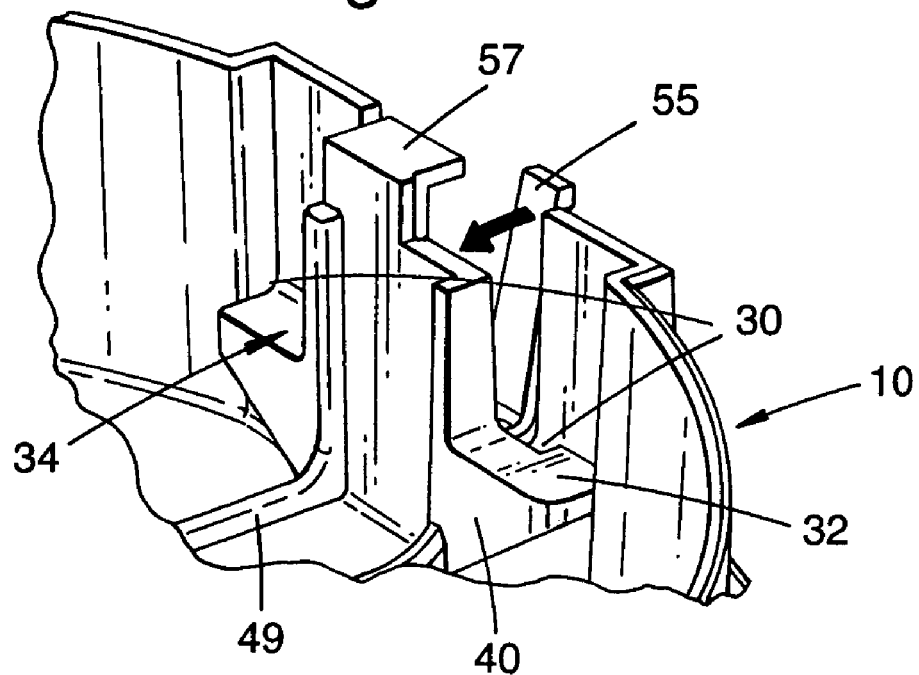
FIG. 3 depicts a close-up perspective view of a section of the mousetrap of FIG. 1, showing, in particular, the way in which the pivot means engages the second part of the mousetrap.
Figure 6:
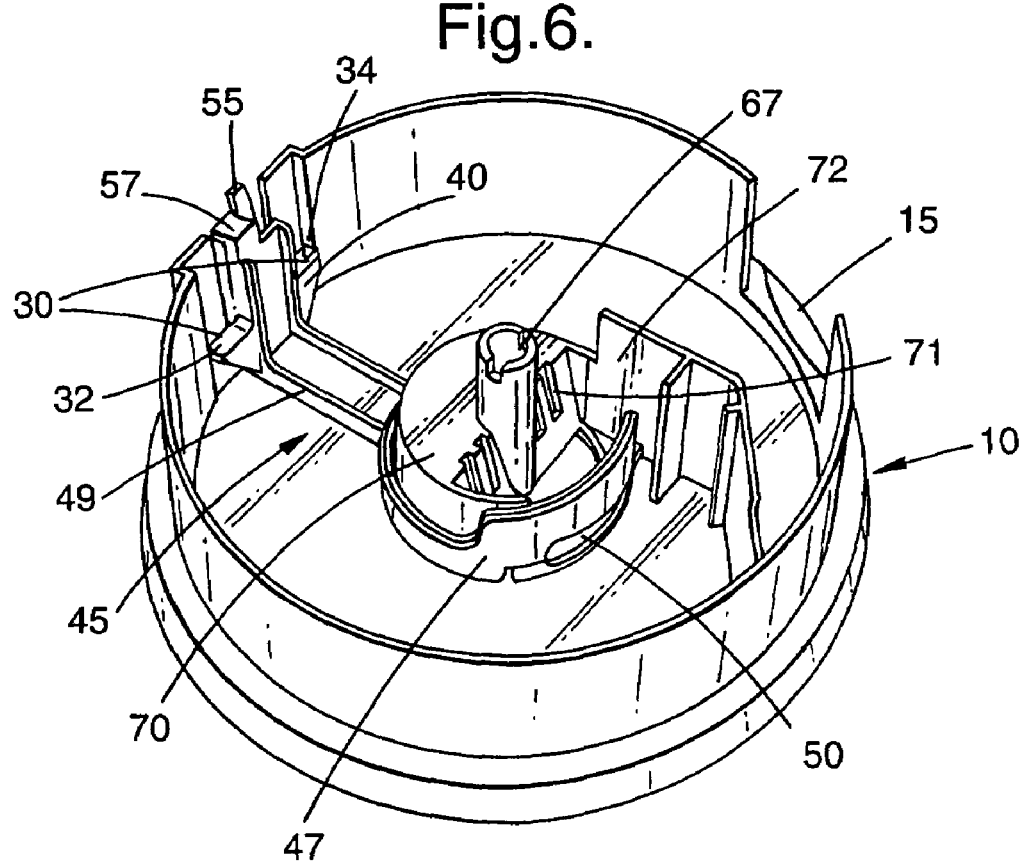
FIG. 6 depicts a perspective view of the second part of the mousetrap of FIG. 1, showing, in particular, the internal parts of the mousetrap.

FIG. 3 shows a perspective view of a section of the second part 10 and the lever 45 (shown in whole in FIG. 6) of the mousetrap in accordance with the preferred embodiment of the invention. Shown, in particular, are holes 30 located on the second part 10, into which projections 32 and 34 extending from the pivot means 40 are slotted, to thereby allow the lever 45 to pivot upon movement by the mouse as it crawls through the gap (50, as shown in FIG. 6) and moves the lever 45. Also shown is the direction (as indicated by the bold arrow) in which the second biasing means 55, in the form of an arm in the preferred embodiment, moves when compressed upon the lever 45 being contacted and moved, by the mouse.

Figure 4:
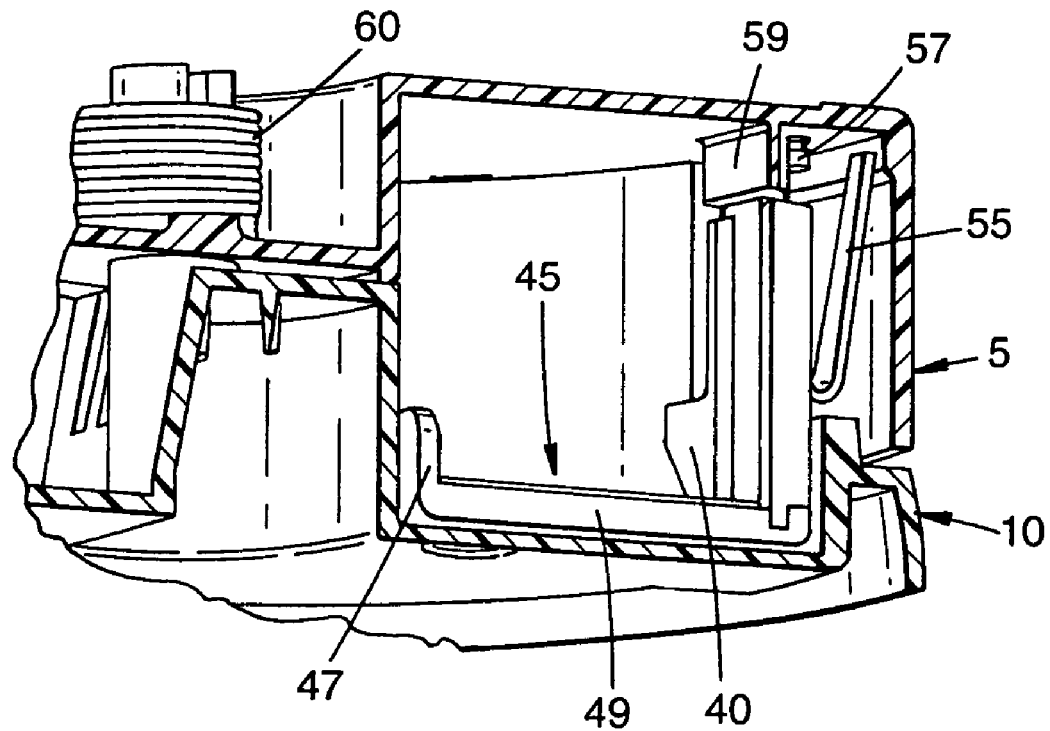
FIG. 4 depicts a perspective cross-sectional view of the mousetrap of FIG. 1, showing, in particular, how the lever is biased in a resting position.

Referring to FIG. 4, a cross-sectional view of the mousetrap according to the preferred embodiment is shown with a lever 45 having a first end 47, a bridge 49 and a pivot means 40 about which the lever 45 is able to pivot as previously described with reference to FIG. 3. Shown, in particular, is how the lever 45 is biased into a resting position through contact with the first part 5. As described above, as the mouse crawls through the gap 50, it contacts and moves the lever so that the second biasing means 55 is compressed in the direction of the bold arrow (see FIG. 3). As the mouse moves the lever, the releasable catch means 57 of the lever 45 disengages the stop means 59 thereby activating the mousetrap.

FIG. 4 also shows how the mousetrap interior parts interact to allow the mousetrap to be set in the open position ready to trap a mouse. The first part 5 and the second part 10 are operably connected to a first biasing means 60. To set the trap, a user manually rotates the first part 5 in an anti-clockwise direction in relation to the second part 10 against the force of the first biasing means 60 thereby storing potential energy within the first biasing means 60. The mousetrap is held in the open or "set" position against the force of the first biasing means 60 by engagement of the releasable catch means 57 located on the lever 45 with the stop means 59 located on the first part 5. When the mousetrap is in the open, or "set", position, the mouse will enter the enclosure through the apertures (15, see FIG. 2) and travel through the enclosure in the anti-clockwise direction until it reaches the lever 45.

Due to its inquisitive nature and/or to the attractive odour of the bait, it will attempt to crawl through the gap (50, shown clearly in FIG. 6) thereby causing the lever 45 to pivot at the pivot means 40 and raise at the first end 47. As the lever 45 is raised, it causes the releasable catch means 57 to disengage the stop means 59 causing the first part 5 to contra-rotate under the force of the first biasing means 60 so that the mousetrap assumes the closed position (as shown in FIG. 1).

Still referring to FIG. 4, by virtue of a second biasing means 55, the mousetrap is able to be set from the closed position to the open position while held in any orientation; that is, by virtue of the lever 45 being biased in the resting position, the releasable catch means 57 located on the lever 45 is able to engage the stop means 59 located on the first part 5 even when the mousetrap is held, for example, upside down. Also, activation of the mousetrap is substantially avoided through the presence of the second biasing means 55, which in the preferred embodiment is in the form of an arm extending from the lever 45. The second biasing means 55 is resiliently compressible and pivotally connected to the lever 45. As the second biasing means 55 is biased against the first part 5 into a resting position, accidental activation of the mousetrap is minimised or substantially avoided as the lever 45 is unable to move (to thereby disengage the releasable catch means 57 from the stop means 59), when the mousetrap is picked up and turned upside down or in any orientation which subjects the lever 45 to movement under the force of gravity. By virtue of its resilient compressibility however, the second biasing means 55 allows the mouse to raise the lever 45 as it crawls through the gap 50 and thereby cause the releasable catch means 57 to disengage the stop means 59 and allow activation of the mousetrap.

It will be appreciated that although the second biasing means 55 in this preferred embodiment is an extension of the lever 45, other configurations of the second biasing means are possible, for example, the second biasing means may be connected to the first part 5 and be biased against the lever 45. It will also be appreciated that the function of the second biasing means 55 is to bias the lever into a resting position thereby allowing setting the mousetrap while held in any orientation and for increased stability of the mousetrap—that is, accidental activation of the mousetrap is substantially avoided when the mousetrap is picked up and turned upside down, yet activation is allowed when the mouse enters the mousetrap enclosure and crawls through the gap 50 in an attempt to reach the bait located in the bait housing (70, as shown in FIG. 6).

Figure 5:
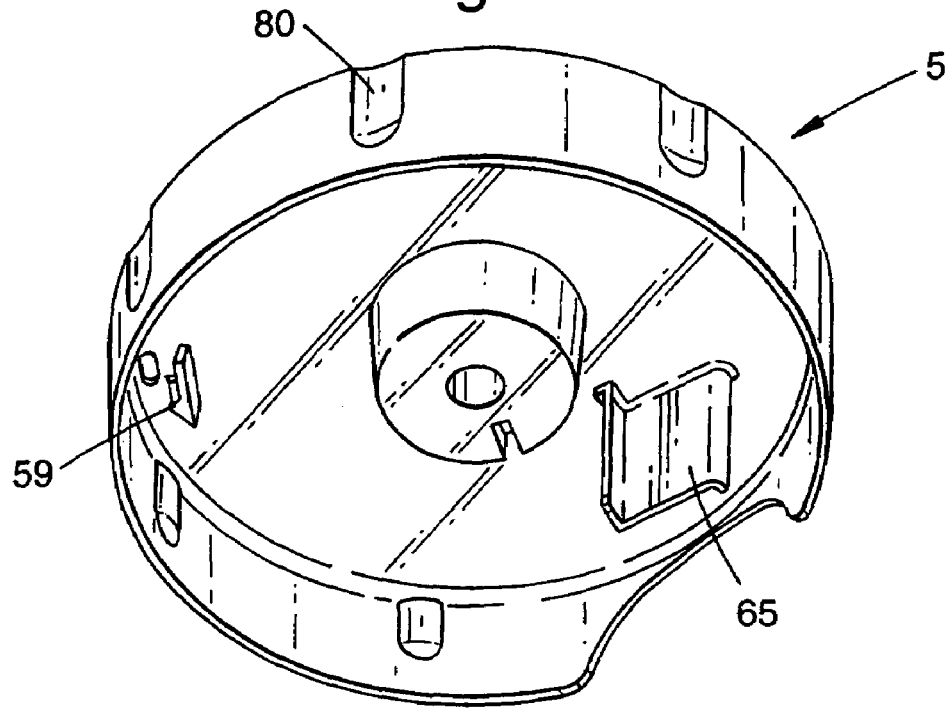
FIG. 5 depicts a perspective view of the first part of the mousetrap of FIG. 1 showing, in particular, the underside of the first part.

Referring to FIG. 5, the underside of the first part 5 of the mousetrap 1 is shown having a stop means 59. FIG. 5 also shows depressions 80 which allow the user to maintain a firmer grip on the mousetrap 1 when rotating the first part 5 in relation to the second part 10 when setting the mousetrap 1 from the closed to the open position. FIG. 5 also shows a strike plate 72 located on the interior of the first part 5. This configuration allows the mouse to be trapped between the catch plate 72 located on the second part 10 and the strike plate 65 located on the first part 5 as the first part 5 and the second part 10 rotate relative to each other thereby incapacitating or killing the mouse.

FIG. 6 shows how the lever 45 is located within the second part 10. FIG. 6 also shows the gap 50 defined by the first end 47 of the lever 45 and the second part 10. The lever is allowed to pivot and raise as the mouse crawls through the gap 50 by virtue of projections 32 and 34 located on the pivot means 40 which are slotted into holes 30 located on the second part 10. That is, the mouse crawls through the gap 50 thereby lifting the lever 45 in an attempt to reach the bait (not shown) located in the bait housing 70 with vents 71. Also shown in FIG. 6 are the lever 45 components comprising: a bridge 49 connecting a first end 47 with a pivot means 40, a releasable catch means 57 which engages the stop means 59. Also shown is the second biasing means 55. FIG. 6 further shows a catch plate 72 located on the second part 10.

Figure 7:
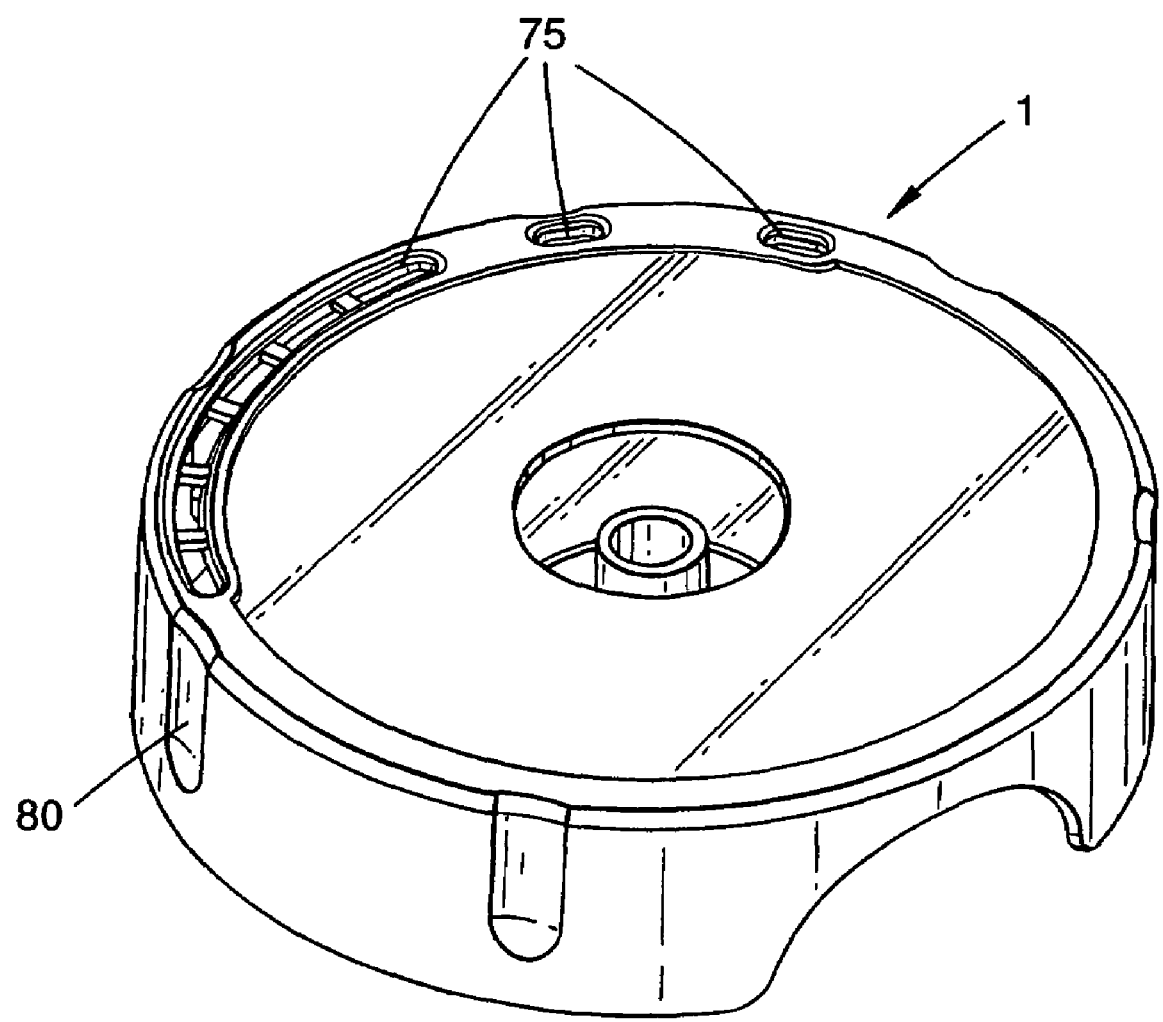
FIG. 7 depicts a perspective view of the first part of the mousetrap of FIG. 1 wherein the label has been removed, showing, in particular, three slots through which a user is able to ascertain, by visual inspection, whether the mousetrap is in the "set", not-set" or "trapped" position.

FIG. 7 depicts a perspective view of the first part 5, showing, in particular, slots 75, through which the releasable catch means 57 located on the lever 45 is able to be observed by the user so as to ascertain, by visual inspection, whether the mousetrap in the "set", "not set" or "mouse trapped" position. Also shown are depressions 80, located on the exterior surface of the first part 5, which provide a user with a firmer grip in order to rotate the first part 5 in relation to the second part 10 when setting the mousetrap from the closed to the open position.

Figure 8:
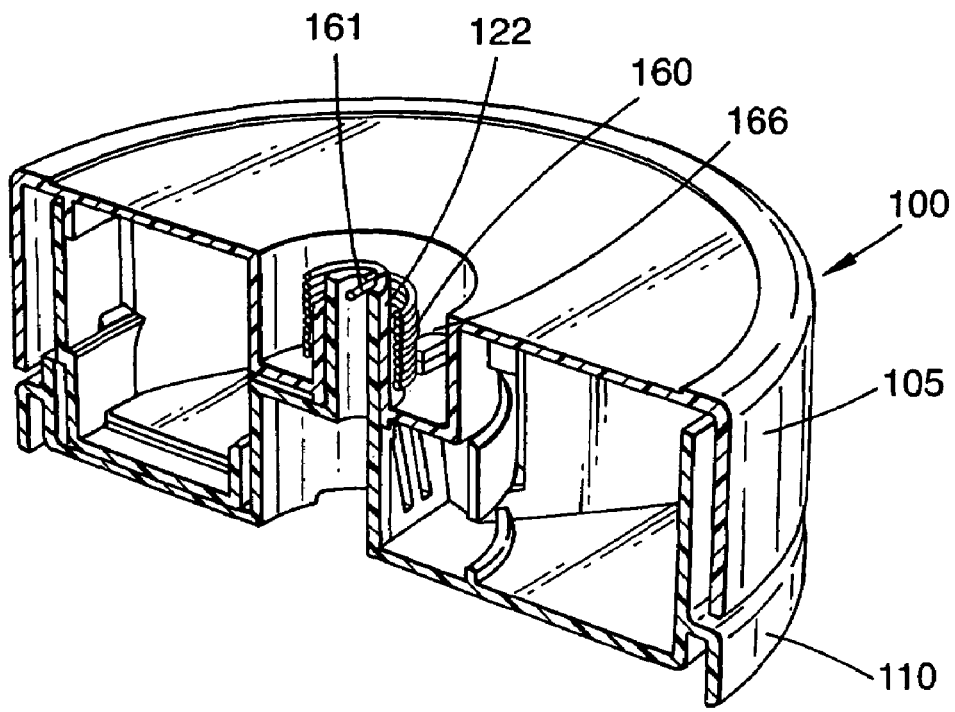
FIG. 8 depicts a perspective cross-sectional view of the mousetrap according to an alternative embodiment of the invention, showing, in particular, how the first part and the second part are operably connected to the first biasing means.

FIG. 8 is directed to an alternative embodiment of the invention in which the slots have been omitted from the top of the first part 105. This figure shows, in particular, the way in which the first part 105 and the second part 110 interfit and are operably engaged to a first biasing means 160. In particular, the first biasing means 160 comprises an first end 161 which slots into a cavity 120 (shown more clearly on FIG. 10) located on the spindle 122 (see also FIG. 10) of the second part 110. The first biasing means 160 also comprises a second end 163 (shown in FIG. 10) which engages a retaining member 166 located on the first part 105. As such, the first biasing means 160 is operably connected to the first part 105 and the second part 110 and serves to hold the first part 105 and the second part 110 together, and also to bias the mousetrap 100 towards a closed position. It will be appreciated that while the way in which the first biasing means 160 is operably connected to the first part 105 and the second part 110, such an arrangement is also applicable to the preferred embodiment of the invention shown in FIGS. 1 to 7.

Figure 9:
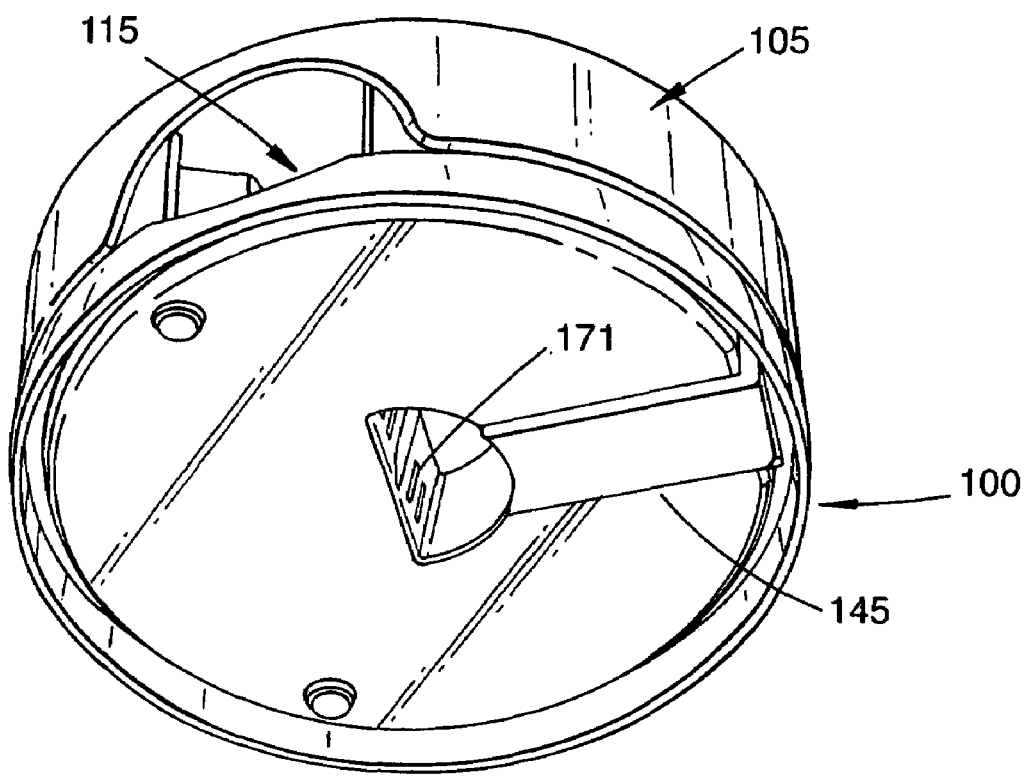
FIG. 9 depicts a perspective view of the mousetrap of FIG. 8 showing, in particular, the underside of the mousetrap.

FIG. 9 depicts the mousetrap of FIG. 8 showing, in particular, the underside the mousetrap with bait housing 170 with bait vents 171. In this way, a user is able to load the mousetrap 100 with bait (not shown) externally of the mousetrap. It is also envisaged that baits such as grains, nuts or seeds presented as whole or broken pieces, or as the base for a paste, gel, pellet, or extruded or moulded wax-block formulations with or without additional pheromone or animal- or plant-derived ingredients, are able to stored long-term within the mousetrap and sold as a single unit to the consumer.

Figure 10:
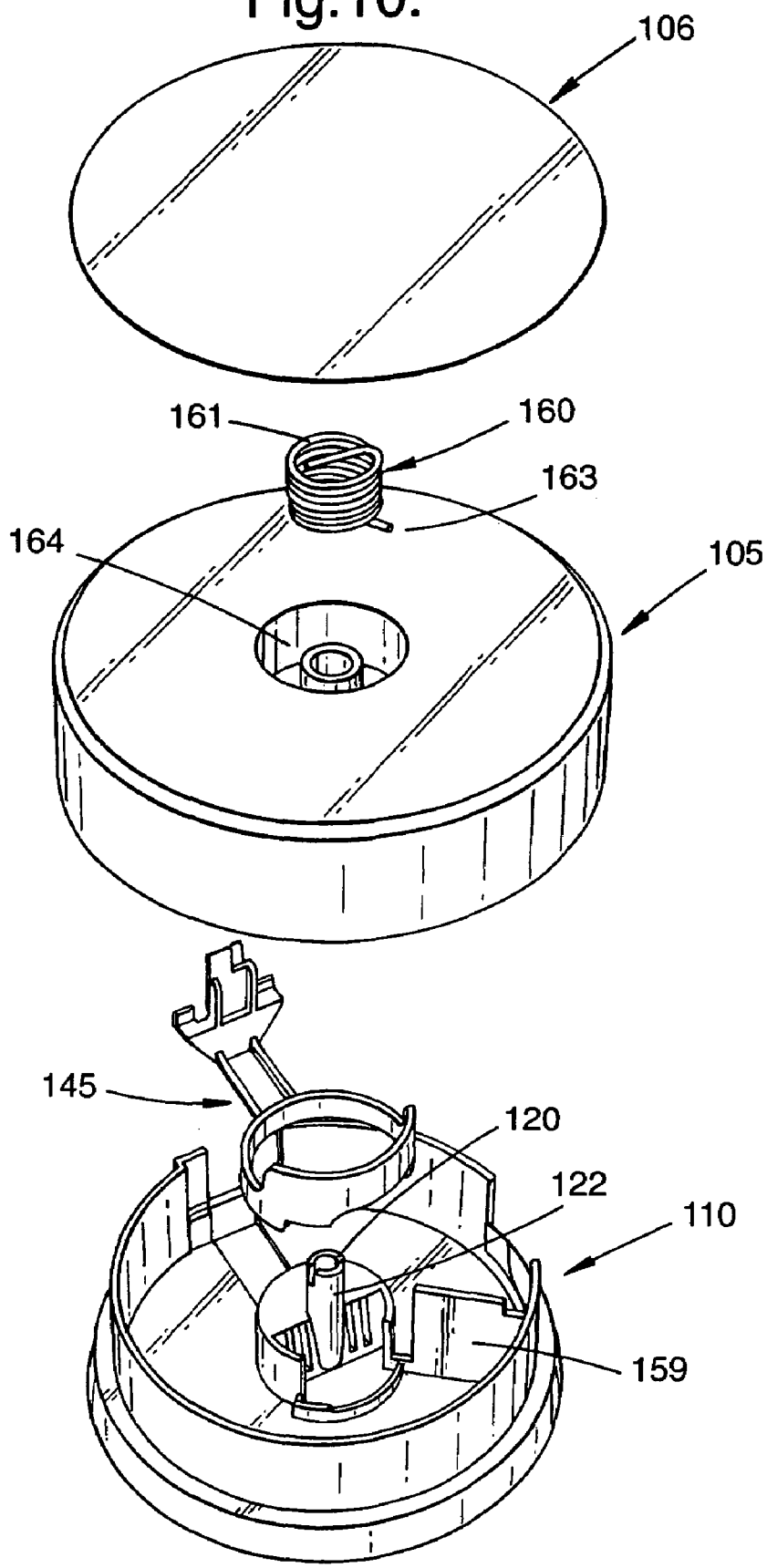
FIG. 10 depicts an exploded view of the mousetrap according to FIG. 8.

The way in which the mousetrap is assembled is depicted in FIG. 10 in which the mousetrap component parts are shown in vertical alignment in accordance with the alternative embodiment of the invention. Most of the component parts may be adapted to snap into position and may be assembled by a layering arrangement wherein the parts are sequentially arranged in position from the second part 110 to the label 106 in the following way: the second part 110 comprising a stop means 159 is adapted to retain a lever 145 that fits about a spindle 122, followed by positioning of the first part 105 over the second part 110 followed by the first biasing means 160 inserted in cavity 164 and operably engaged to the first part 105 and the second part 110. The label 106 is then positioned over the first part 105 so as to conceal the first biasing means 160.

Figure 11:
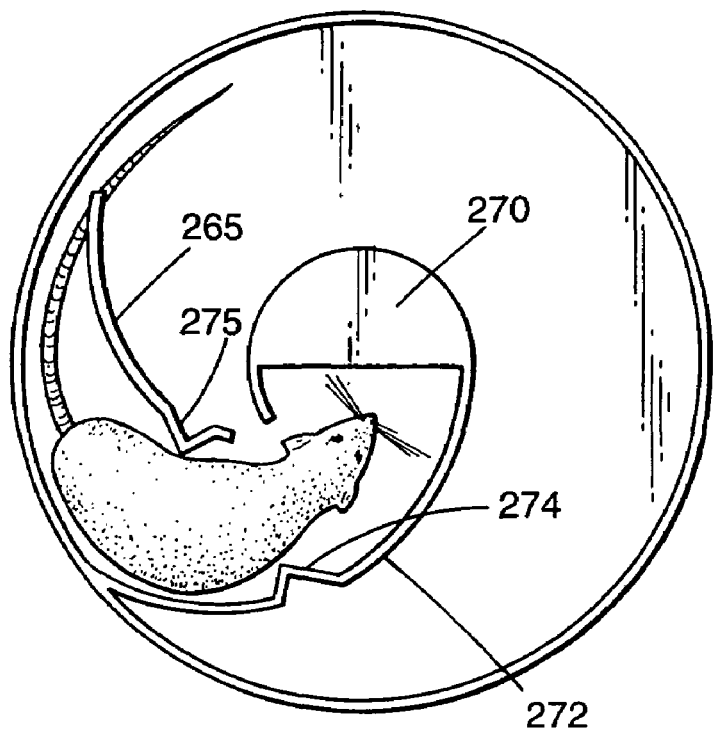
FIGS. 11 and 12 depict plan views of two alternative embodiments of the invention, that show, in particular, preferred strike and catch plate configurations.
Figure 12:
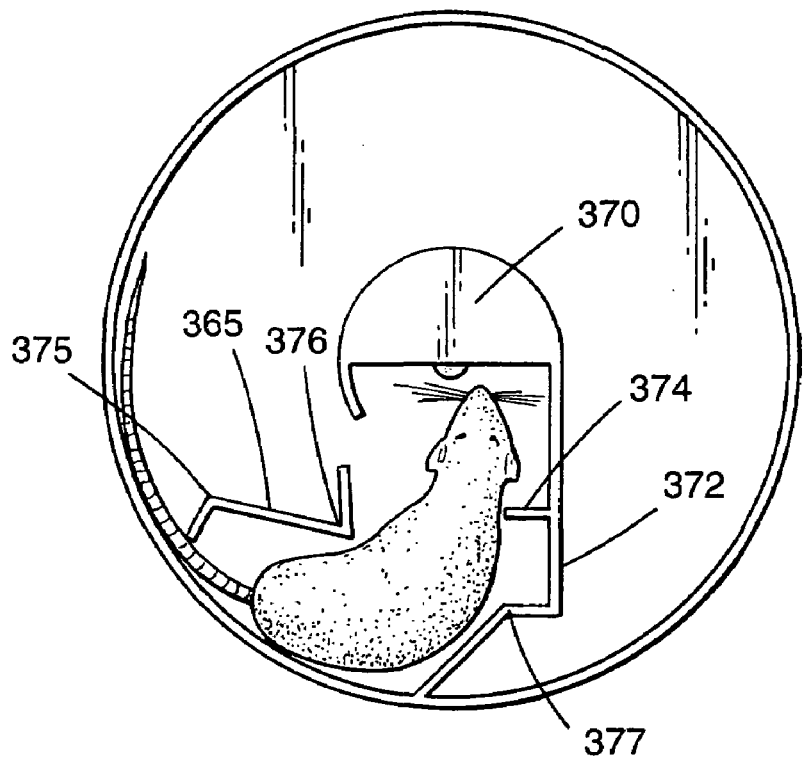

In FIGS. 11 and 12, two alternative mousetrap configurations are shown in plan view showing, in particular, preferred strike plate and catch plate profiles wherein the strike plates and catch plates further comprise one or more projections. As shown in FIG. 11, in a particularly preferred embodiment, the projections are in the form of angular kinks in the strike and/or catch plate profiles. FIG. 11 depicts a mousetrap having a curved strike plate 265 profile and a curved catch plate 272 profile. The curved strike plate 265 and catch plate 272 profiles assist in guiding the mouse to the bait housing 270 while the projection 275 on the strike plate 265 and the projection 274 on the catch plate 272 aim to increase the impact force on the mouse. By virtue of the projections the strike plate and the catch plate, more efficient incapacitation and/or kill of the mouse upon contact with the strike plate and or catch plate is achieved.

In FIG. 12 the mousetrap has a strike plate 365 having multiple projections 375 and 376 (in this case in the form of a kink and a spike) and a catch plate 372 wherein the multiple projections 374 and 377 allow for different points of contact with the mouse thereby increasing the efficiency of incapacitation and/or kill.

The mousetrap in accordance with the present invention may be fabricated from an injection mouldable material such as polypropylene and ABS, however materials such as polyethylene and polystyrene would also be suitable.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed:

1. A mousetrap comprising:
    a first part and a second part together being rotatable with respect to each other and together defining an enclosure, apertures located in each of the first part and the second part, the apertures being in substantial alignment so as to define an entrance for a mouse into the mousetrap when the mousetrap is in an open position;
    a first biasing means operably connected to the first part and the second part in a manner so as to bias the mousetrap towards a closed position;
    means for maintaining the mousetrap in the open position comprising engagement of a lever with a stop means; wherein the lever and the second part define a gap through which a mouse is able to move through and as a result, raise the lever;
    a second biasing means to bias the lever into a resting position;
    the mousetrap being activated to assume the closed position by entry of the mouse whereby the mouse moves through the gap defined by the lever and the second part in a manner so as to cause the lever to rise and thereby disengage from the stop means resulting in the first part contra-rotating relative to the second part by virtue of the first biasing means thereby trapping the mouse and substantially concealing the trapped mouse within the enclosure.

2. The mousetrap according to claim 1 wherein the second biasing means is located on the lever.

3. The mousetrap according to claim 2 wherein the second biasing means is an arm extending from one end of the lever.

4. The mousetrap according to claim 1 wherein the second biasing means is located on the second part.

5. The mousetrap according to claim 1 wherein the lever is retained within the second part and the stop means is located on the first part.

6. The mousetrap according to claim 1 wherein the mousetrap further comprises a strike plate.

7. The mousetrap according to claim 6 wherein the strike plate is located on the first part.

8. The mousetrap according to claim 6 wherein the strike plate further comprises one or more projections.

9. The mousetrap according to claim 1 wherein the lever is retained within the first part and the stop means is located on the second part.

10. The mousetrap according to claim 1 further comprising a catch plate.

11. The mousetrap according to claim 10 wherein the catch plate is located on the second part.

12. The mousetrap according to claim 10 wherein the catch plate further comprises one or more projections.

13. The mousetrap according to claim 1 wherein the engagement of the lever with the stop means is through a releasable catch means located on the lever.

14. The mousetrap according to claim 1 wherein at least one slot is located on the first part or on the second part through which a user is able to ascertain, by visual inspection, whether the mousetrap is in the open position or the closed position.

15. The mousetrap according to claim 1 in which at least a section of the first part and the second part is circular.

16. The mousetrap according to claim 1 in which the enclosure is circular in shape.

17. The mousetrap according to claim 1 in which the first biasing means is a helical torsion spring.

18. The mousetrap according to claim 1 further comprising a bait housing.

19. The mousetrap according to claim 18 wherein the bait housing is located substantially in the centre of the enclosure.

20. The mousetrap according to claim 1 wherein the second part further includes a lip adapted to fit around the first part of another mousetrap thereby allowing two or more mousetraps to be stacked.

* * * * *